(12) United States Patent
Kim

(10) Patent No.: US 8,837,015 B2
(45) Date of Patent: *Sep. 16, 2014

(54) ILLUMINATOR AND IMAGE READING DEVICE AND IMAGE FORMING APPARATUS HAVING THE SAME

(71) Applicant: Samsung Electronics Co., Ltd., Suwon-si (KR)

(72) Inventor: Kyung Rok Kim, Seongnam-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/087,678

(22) Filed: Nov. 22, 2013

(65) Prior Publication Data

US 2014/0079437 A1 Mar. 20, 2014

Related U.S. Application Data

(63) Continuation of application No. 13/725,181, filed on Dec. 21, 2012, now Pat. No. 8,619,343, which is a continuation of application No. 12/606,434, filed on Oct. 27, 2009, now Pat. No. 8,358,450.

(30) Foreign Application Priority Data

Jan. 14, 2009 (KR) ........................ 10-2009-0002958

(51) Int. Cl.
*H04N 1/04* (2006.01)
*H04N 1/028* (2006.01)
*G03G 15/04* (2006.01)
*G03G 15/02* (2006.01)
*F21V 8/00* (2006.01)

(52) U.S. Cl.
CPC ....... *G03G 15/0266* (2013.01); *H04N 1/02835* (2013.01); *H04N 1/04* (2013.01); *H04N 1/0282* (2013.01); *H04N 1/02815* (2013.01); *G03G 15/04036* (2013.01); *G02B 6/0001* (2013.01)
USPC ............................. 358/474; 358/475; 358/509

(58) Field of Classification Search
CPC ............ H04N 5/2256; H04N 1/02835; H04N 2005/2255; H04N 1/02895; H04N 1/387; A61B 1/06; A61B 1131/0646; A61B 1/0684; G02B 6/0061; G02B 6/0011; G02B 6/10
USPC .......................... 358/474, 475, 509, 501, 505
See application file for complete search history.

(56) References Cited

U.S. PATENT DOCUMENTS 5,550,657 A 8/1996 Tanaka et al.
5,684,908 A 11/1997 Kross et al.
(Continued)

FOREIGN PATENT DOCUMENTS

JP 2008-140726 6/2008

OTHER PUBLICATIONS

Notice of Allowance mailed Sep. 19, 2012 in related U.S. Appl. No. 12/606,434.

(Continued)

*Primary Examiner* — Negussie Worku
(74) *Attorney, Agent, or Firm* — Staas & Halsey LLP

(57) ABSTRACT

An image forming apparatus employing an illuminator configured to irradiate light to a photosensitive body to change a level of electrical potential of the photosensitive body. The illuminator includes at least one light source configured to generate light and a light guide configured to guide the light received from the light source toward the photosensitive body. The light guide includes at least one incidence face and an emission face. The at least one incidence face faces the light source in a main scanning direction to receive the light from the light source into the light guide. The light exits from the light guide through the emission face toward the photosensitive body. The emission face includes a diffusion pattern having a plurality of semi-cylindrical structures along a width direction of the light guide. A radius of curvature of the semi-cylindrical structures increases away from the at least one light source.

6 Claims, 9 Drawing Sheets

(56) References Cited

U.S. PATENT DOCUMENTS

| | | | |
|---|---|---|---|
| 7,027,757 B2 * | 4/2006 | Jeong | 399/128 |
| 7,053,921 B2 * | 5/2006 | Chino | 347/241 |
| 7,088,477 B2 | 8/2006 | Koshimizu et al. | |
| 7,151,246 B2 | 12/2006 | Fein et al. | |
| 7,385,169 B2 | 6/2008 | Saitou et al. | |
| 7,428,080 B2 | 9/2008 | Koshimizu et al. | |
| 7,791,683 B2 | 9/2010 | Larson et al. | |
| 7,852,523 B2 * | 12/2010 | Cho et al. | 358/484 |
| 7,852,525 B2 | 12/2010 | Nogami et al. | |
| 7,863,552 B2 | 1/2011 | Cartlidge et al. | |
| 7,884,532 B2 | 2/2011 | Lee et al. | |
| 7,924,478 B2 * | 4/2011 | Kim et al. | 358/484 |
| 7,995,252 B2 * | 8/2011 | Okamoto et al. | 358/487 |
| 8,007,160 B2 | 8/2011 | Kim | |
| 8,109,666 B2 | 2/2012 | Sawada et al. | |
| 8,158,040 B2 | 4/2012 | Kim et al. | |
| 8,248,556 B2 | 8/2012 | Larson et al. | |
| 8,310,737 B2 * | 11/2012 | Nagao et al. | 358/475 |
| 8,358,450 B2 | 1/2013 | Kim | |
| 8,379,275 B2 * | 2/2013 | Tahk et al. | 358/475 |
| 8,441,602 B2 | 5/2013 | Kim et al. | |
| 8,462,402 B2 * | 6/2013 | Kim | 358/475 |
| 8,488,216 B2 * | 7/2013 | Sakamoto et al. | 358/475 |
| 8,498,026 B2 * | 7/2013 | Mikuni et al. | 358/474 |
| 8,570,616 B2 * | 10/2013 | Endo | 358/474 |
| 8,576,460 B2 * | 11/2013 | Takeda et al. | 358/475 |
| 8,599,445 B2 * | 12/2013 | Kisara et al. | 358/474 |
| 8,619,343 B2 * | 12/2013 | Kim | 358/474 |

OTHER PUBLICATIONS

English language abstract of JP 2008-140726, published Jun. 19, 2008.

Machine English language translation of JP 2008-140726, published Jun. 19, 2008.

Office Action mailed Apr. 25, 2012 in related U.S. Appl. No. 12/606,434.

Office Action mailed May 2, 2013 in related U.S. Appl. No. 13/725,181.

Notice of Allowance mailed Aug. 22, 2013 in related U.S. Appl. No. 13/725,181.

U.S. Appl. No. 13/725,181 Dec. 21, 2012 Kyung Rok Kim Samsung Electronics Co., Ltd.

* cited by examiner

ILLUMINATOR AND IMAGE READING DEVICE AND IMAGE FORMING APPARATUS HAVING THE SAME

CROSS-REFERENCE TO RELATED APPLICATIONS

This is a continuation of U.S. patent application Ser. No. 13/725,181, filed Dec. 21, 2012, which is a Continuation of U.S. patent application Ser. No. 12/606,434 which claims the benefit of Korean Patent Application No. 10-2009-0002958, filed on Jan. 14, 2009 in the Korean Intellectual Property Office, the disclosure of which is incorporated herein by reference in its entirety.

BACKGROUND

1. Field

The present disclosure relates generally to an illuminator and, more particularly, to an illuminator having a light guide to guide light generated from a light source to an object to be illuminated, and to an image reading device and image forming apparatus employing such illuminator.

2. Description of the Related Art

An image reading device is provided in a variety of electronic appliances, such as digital scanners, copiers, facsimiles, and the like, as well as devices combining some of the functions thereof, and serves to read image information recorded on a document.

Generally, an image reading device may include an illuminator to irradiate light to a document, an image sensor to sense the light reflected from the document, and an optical system to guide the reflected light from the document to the image sensor. The illuminator may include a light source to generate light and a light guide to guide the light generated from the light source toward the document.

An illuminator with a light guide is also often used as a charge eliminator to eliminate or reduce electric potential remaining on a surface of a photosensitive body provided in an electro-photographic image forming apparatus, such as, for example, a laser printer and a digital copier.

To assure good performance of the image reading device and/or the charge eliminator, an illuminator desirably irradiates light uniformly or near uniformly in the main scanning direction and/or in the sub scanning direction.

SUMMARY

According to an aspect of the present disclosure an illuminator may be provided to include at least one light source configured to generate light and a light guide including at least one incidence face facing the light source and an emission face configured to emit the light to a target object. A diffusion pattern may be formed on the emission face to extend from one longitudinal end to the other longitudinal end of the emission face.

The emission face may have a constant cross section along the longitudinal direction thereof. The emission face may alternatively have a cross section that varies along the longitudinal direction thereof. The emission face may be symmetrical about a longitudinal center.

For example, the diffusion pattern may include a plurality of semi-cylindrical structures arranged along the width direction of the emission face. A radius of curvature of the plurality of semi-cylindrical structures may be constant along the length of the emission face or it may alternatively increase or decrease from the longitudinal end to or near the center of the light guide.

The at least one light source may include a first light source that faces one end surface of the light guide and a second light source that faces the other end surface of the light guide. The light source may include a light emitting diode (LED).

According to another aspect, an image reading device may be provided to include a reading device body within which a reading unit is installed. The reading unit may include an illuminator, a moving optical system and an image sensor. The illuminator may be configured to move in a sub scanning direction, and may be configured to irradiate light onto a document in a main scanning direction. The moving optical system may be configured to move in the sub scanning direction relative to the illuminator. The image sensor may be configured to receive the light reflected from the document, and may be configured to convert the received light into electric signals. In one example, the illuminator may include a plurality of light sources arranged along the sub scanning direction and a plurality of light guides arranged to correspond to the plurality of light sources. The plurality of light guides may be configured to irradiate light to different regions of the document along the sub scanning direction.

According to yet another aspect, an image forming apparatus may be provided to include an illuminator for irradiating light to a photosensitive body for removal of electric potential. The illuminator may include at least one light source to generate light and a light guide to guide the light of the light source to the photosensitive body The light guide may include at least one incidence face facing the light source in a main scanning direction and an emission face that emits light to the photosensitive body. A diffusion pattern may be formed on the emission face and extends from one end to the other end of the emission face in the main scanning direction.

BRIEF DESCRIPTION OF THE DRAWINGS

Various features and advantages of the disclosure will become more apparent by the following detailed description of several embodiments thereof with reference to the attached drawings, of which.

DETAILED DESCRIPTION

Figure 1:
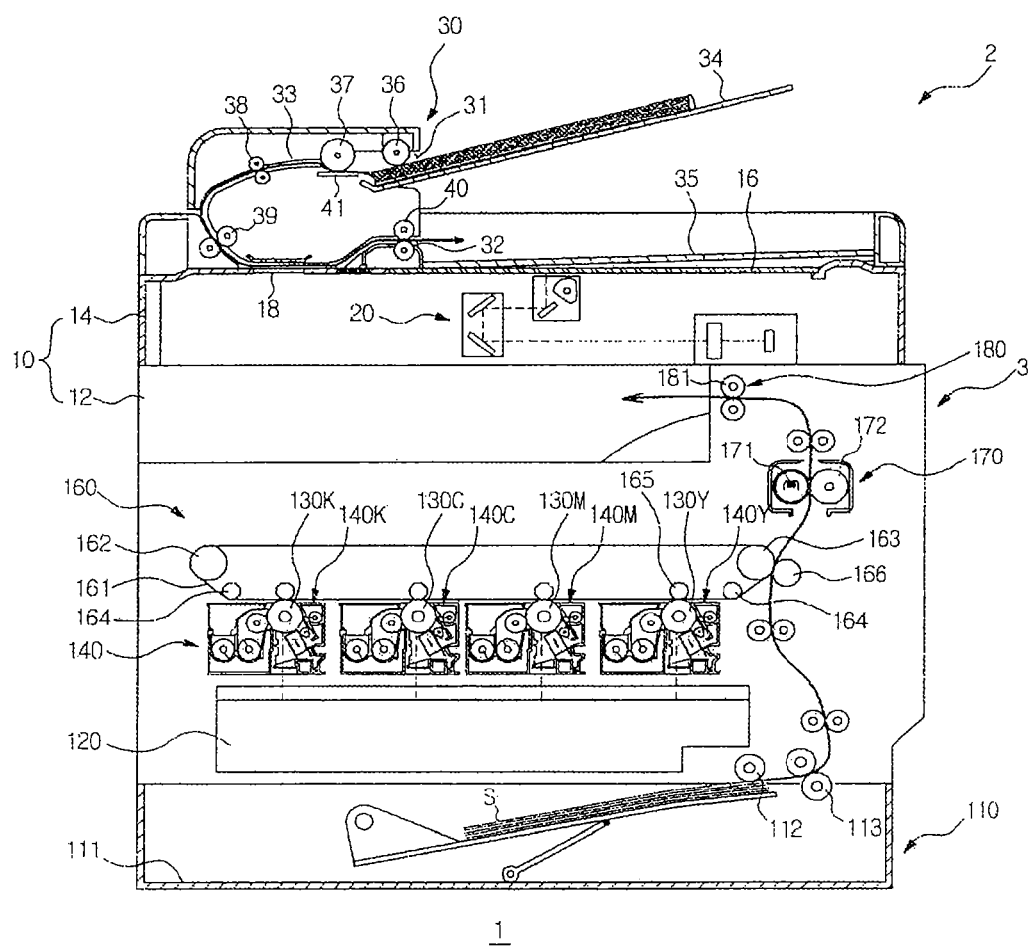
FIG. 1 is a view illustrating a configuration of an image forming apparatus according to an embodiment.

Reference will now be made in detail to the embodiments of the present invention, examples of which are illustrated in the accompanying drawings, wherein like reference numerals refer to the like elements throughout. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

With reference to FIG. 1, an image forming apparatus 1 is schematically illustrated. As shown in FIG. 1, the image forming apparatus 1 may include an image reading device 2 configured to read an image recorded on a document and a printing device 3 configured to print the image on paper or another medium.

The image reading device 2 may include a reading device body 10 that includes a reading frame 12 and a cover 14. The cover 14 may be pivotally and/or rotatably coupled to the reading frame 12 to open or close an upper surface of the reading frame 12. The cover 14 may be provided with an automatic document feeder (ADF) 30 that may be configured to feed documents to enable, for example, multiple scanning operations in succession.

A document tray 16 and an ADF glass 18 may be installed and provided at an upper surface of the reading frame 12. The document tray 16 may be configured to allow for a user to place documents thereon, sheet by sheet, for example. The ADF glass 18 may be provided and configured to allow the user to read documents delivered by the ADF 30.

A reading unit 20, configured to read information recorded on a document, may be provided in the reading frame 12. The reading unit 20 may be configured to read image information recorded on a document placed on the document tray 16 or on a document delivered by the ADF 30 by irradiating light to the document, by detecting light reflected from the document and by converting a detected quantity of the light into electric signals.

The ADF 30 may include a document inlet 31 into which a document to be read is introduced, a document outlet 32 from which a read document is discharged, a document delivery path 33 defined in the interior of the cover 14 for document delivery, and various rollers arranged and configured on the document delivery path 33 for document delivery.

The document inlet 31 may be installed and positioned at one side of the cover 14, while the document outlet 32 may be installed and positioned under the document inlet 31, for example. A document feed tray 34 may be provided near the document inlet 31, on which documents to be delivered by the ADF 30 may be loaded. Also, a document discharge tray 35 may be provided near the document outlet 32, on which documents discharged from the document outlet 32 may be loaded and/or received.

The document delivery path 33 may have, according to an embodiment, an approximated C-shaped form. One end of the document delivery path 33 may be connected to the document feed tray 34 through the document inlet 31, while the other end of the document delivery path 33 may be connected to the document discharge tray 35 through the document outlet 32. The document delivery path 33 may alternatively comprise other forms or shapes.

The rollers for document delivery may include, but are not limited to, a document pickup roller 36 configured to pick up the documents loaded on the document feed tray 34; first, second and third delivery rollers 37, 38 and 39 configured to deliver the documents picked-up by the document pickup roller 36 along the document delivery path 33; and a document discharge roller 40 configured to discharge the read documents to the document discharge tray 35. The first delivery roller 37 closest to the document pickup roller 36 and an optional frictional pad 41 may function and be configured to separate the documents picked-up by the document pickup roller 36 into individual sheets. The optional frictional pad 41 may be installed and provided opposite the first delivery roller 37.

Figure 2:
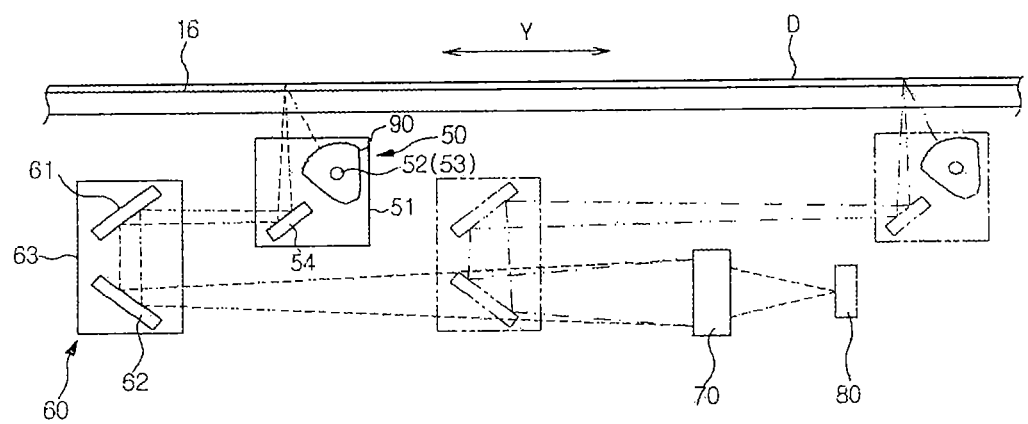
FIG. 2 is a view illustrating the configuration of a reading unit reading device according to an embodiment usable in an image.

Referring to FIG. 2, a schematic representation of the reading unit 20 included in the image reading device 2 is shown according to an embodiment. The reading unit 20 may include an illuminator 50, a moving optical system 60, a condensing lens 70 and an image sensor 80.

Figure 3:
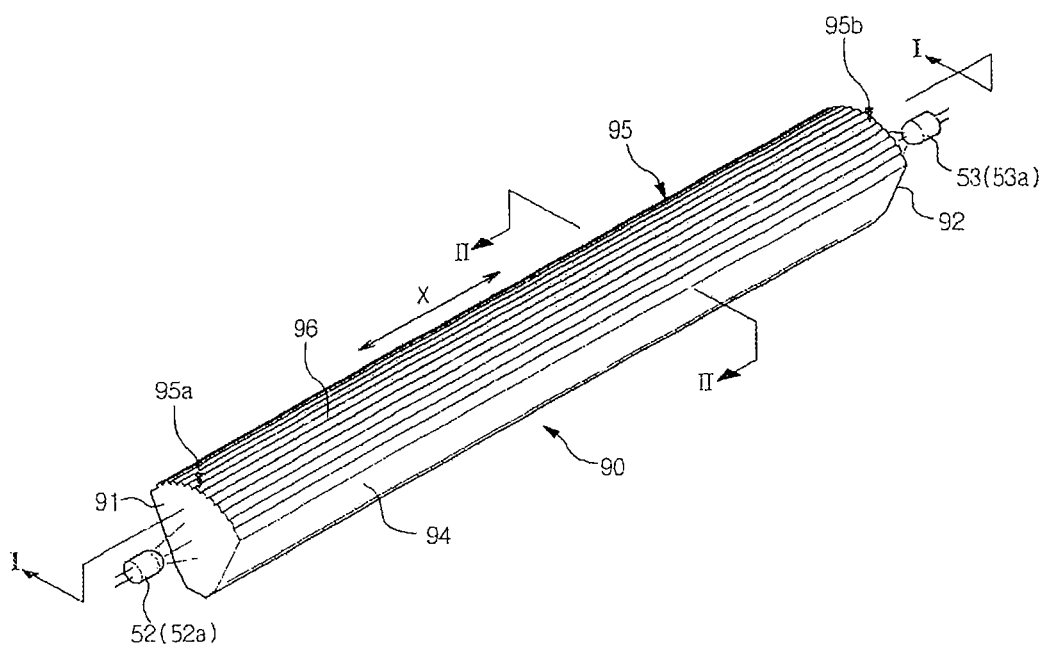
FIG. 3 is a perspective view illustrating a light source and a light guide included in an illuminator according to an embodiment.

FIG. 3 provides a perspective view of a light source and a light guide capable of being utilized in the illuminator 50 according to an embodiment.

The illuminator 50 may be configured to irradiate light to a document along a main scanning direction (designated by the arrow X as shown in FIG. 3) to enable document reading. When located under the ADF glass 18, the illuminator 50 irradiates light to a document delivered by the automatic document feeder 30. When located under the document tray 16, the illuminator 50 irradiates light to a document placed on the document tray 16.

The illuminator 50 may include a first carriage 51 movably installed in a sub scanning direction (designated by the arrow Y as shown in FIG. 2) and may be configured to irradiate light to a document D placed on the document tray 16 while moving along the sub scanning direction Y. The first carriage 51 may include one or more light sources 52 and/or 53, a light guide 90, and a reflecting mirror 54. The light guide 90 may be configured to guide light generated from the light sources 52 and/or 53 toward the document D.

The moving optical system 60 may include a plurality of reflecting mirrors, such as reflecting mirrors 61 and 62, to guide the light reflected from the document D to the image sensor 80. The reflecting mirrors 61 and 62 may be mounted on a second carriage 63, which may be installed to be movable along the sub scanning direction Y.

The illuminator 50 and the moving optical system 60 may be adapted and configured to be moved at different speeds in the sub scanning direction to maintain a constant length of the total optical path. When the illuminator 50 irradiates light to the document D while moving at a speed V, for example, the moving optical system 60 may be moved at a speed V/2 to reflect the light emitted from the illuminator 50 to the image sensor 80. Both the illuminator 50 and moving optical system 60 may be driven by a drive mechanism including, for example, a drive motor, pulley and/or wire (not shown).

The condensing lens 70 and the image sensor 80 may be kept at fixed positions in the reading device body 10. The condensing lens 70 may be located in front of the image sensor 80 based on the optical path to focus the light reflected from the moving optical system 60 on the image sensor 80.

The image sensor 80 may be configured to receive and convert the light reflected from the document D into electric signals. The image sensor 80 may be a Charge Coupled Device (CCD) image sensor or a Complementary Metal Oxide Semiconductor (CMOS) image sensor, for example. The image sensor 80 is not limited to any particular type of image sensor. In the case of a high-speed image reading device capable of reading a document of a size greater than, for example, A3 size, it may be desirable to adopt a CCD image sensor having a greater resolution and depth of focus, for example.

The image sensor 80 may be configured such that different color sensors, for example, red, green and blue sensors, are arranged in rows on a per color basis.

Figure 4:
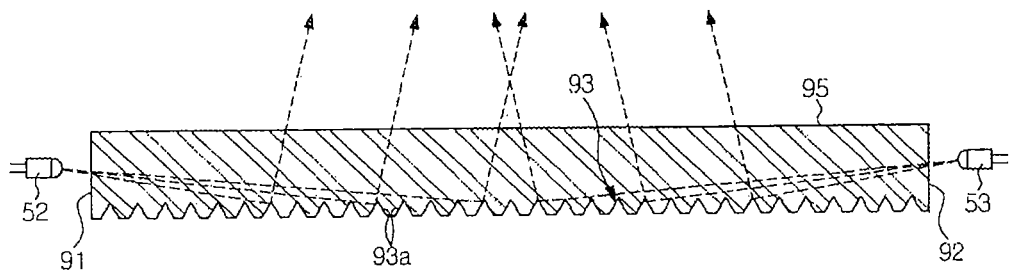
FIG. 4 is a sectional view taken along the line I-I of FIG. 3.
Figure 5:
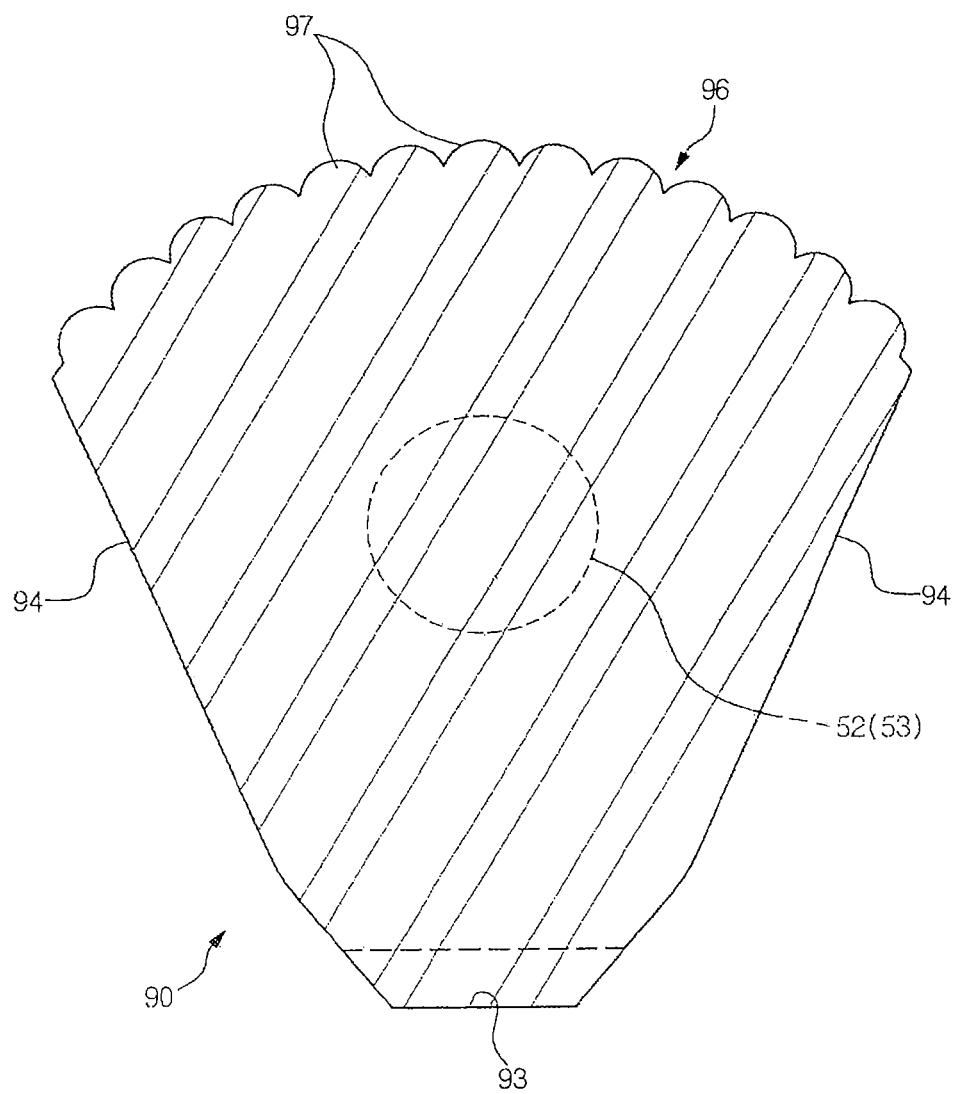
FIG. 5 is a sectional view taken along the line II-II of FIG. 3.

FIG. 4 is a sectional view taken along the line I-I of FIG. 3, and FIG. 5 is a sectional view taken along the line II-II of FIG. 3.

As shown in FIGS. 2 to 5, the light guide 90 of the illuminator 50 may take the form of a bar having a longitudinal direction corresponding to the main scanning direction X and a width direction corresponding to the sub scanning direction Y. The light guide 90 may be made of an acryl-based resin, such as, for example, PolyMethyl MethAcrylate (PMMA), or a transparent synthetic resin, such as, for example, polycarbonate or polystyrene. The light guide however is not limited to any particular type of material or substance.

The first light source 52 and the second light source 53 may be arranged, according to an embodiment, at opposite longitudinal sides of the light guide 90. Arranging the light sources 52 and 53 at opposite sides of the light guide 90 may enable uniform or near-uniform distribution of light quantity in the main scanning direction X.

According to an embodiment, the first light source 52 and the second light source 53 respectively may include light emitting diodes 52a and 53a. The first light source 52 and the second light source 53 may include, for example, white light emitting diodes. Although FIG. 3 illustrates the light sources 52 and 53 as being respectively arranged at opposite sides of the light guide 90, it is also possible to provide a single light source at one side of the light guide 90. Other configurations are also possible.

The light guide 90 may include incidence faces 91 and 92, a reflecting face 93, guide faces 94, and an emission face 95. In an embodiment, the light, generated from the light sources 52 and 53, is introduced into the light guide 90 via the incidence faces 91 and 92 and is guided toward the emission face 95 via the reflecting face 93 and guide faces 94 to thereby be emitted out of the light guide 90.

The incidence faces 91 and 92 may be defined at opposite longitudinal end surfaces of the light guide 90, respectively, to face the first light source 52 and second light source 53. If a light source is provided at only one longitudinal end surface of the light guide 90, the other end surface of the light guide 90 that does not face the light source may be provided with a reflecting structure (for example, a reflecting coating and/or a reflecting plate).

The reflecting face 93 reflects the light introduced into the light guide 90 via the incidence faces 91 and 92 toward the emission face 95. The reflecting face 93 may include a plurality of reflecting patterns 93a arranged in the main scanning direction. Although FIG. 4 illustrates the reflecting patterns 93a in the form of prisms, semi-cylindrical, semi-spherical, or other lens-shaped reflecting patterns are also possible.

The guide faces 94 may be configured to guide the light reflected from the reflecting face 93 toward the emission face 95. The guide faces 94 may define opposite lateral surfaces of the light guide 90 arranged in the sub scanning direction Y, the guide faces 94 being inclined in such a manner that a width of the light guide 90 increases from the reflecting face 93 to the emission face 95, in an embodiment. With the inclined guide faces 94, it may be possible to effectively prevent loss of light from the light guide 90 when the light reflected by the reflecting patterns 93a is deflected in the width direction Y of the light guide 90.

The emission face 95 may be arranged opposite the reflecting face 93 and may be configured to emit the light guided via the reflecting face 93 and guide faces 94 toward the document D. The emission face 95 may have a predetermined curvature.

The emission face 95 may be provided with a diffusion pattern 96 extending from one end 95a to the other end 95b of the emission face 95 in the longitudinal direction X, for example. The diffusion pattern 96, as shown in FIGS. 3 and 5, may include a plurality of semi-cylindrical structures 97 arranged in the width direction Y of the emission face 95. The diffusion pattern 96 however is not limited to the semi-cylindrical structures 97, and other structures, patterns, or shapes may be utilized.

The diffusion pattern 96 diffuses the light to be emitted from the emission face 95 to enable mixing of adjacent light beams, thus enabling uniform or near-uniform irradiation of light in the sub scanning direction Y. Accordingly, if, for example, a reading position on a document or an image forming position on the image sensor is displaced from an initial design position due to, for example, characteristics of the optical system or an assembly tolerance of optical elements, it is possible to prevent deterioration in reading performance.

For example, in the case of the image reading device 2 as shown in FIG. 2 wherein the illuminator 50 and moving optical system 60 are moving at different speeds, if an installation angle between the two reflecting mirrors 61 and 62 has a tolerance of about 0.5 degrees rather than being accurately 90 degrees, a reading position on an A3-size document may be displaced by about 4 mm in the sub scanning direction Y. In this case, as the illuminator 50 uniformly or near uniformly irradiates light over a predetermined region of the document in the sub scanning direction Y, it is possible to prevent deterioration in reading quality despite the displacement of the reading position on the document.

Further, according to an embodiment, it is noted that the diffusion pattern 96 longitudinally extending throughout the emission face 95 may allow the illuminator 50 to uniformly or near uniformly irradiate light in the main scanning direction X. If the diffusion pattern 96 is formed on only a partial longitudinal region of the emission face 95, a boundary between a region having the diffusion pattern 96 and a region without the diffusion pattern 96 may experience sudden change in light irradiation characteristics, thus resulting in deterioration in reading quality.

The emission face 95 provided with the diffusion pattern 96 may have a constant cross section in the longitudinal direction X and also may be symmetrical in the longitudinal direction X. The symmetric emission face 95 may be desirable when the light sources 52 and 53 are provided at opposite sides of the light guide 90.

Although FIG. 5 illustrates the semi-cylindrical structures arranged in the sub scanning direction Y as having the same radius of curvature along the light guide 90, semi-cylindrical structures having different radiuses of curvature at different portions of the light guide 90 are also possible.

Figure 6:
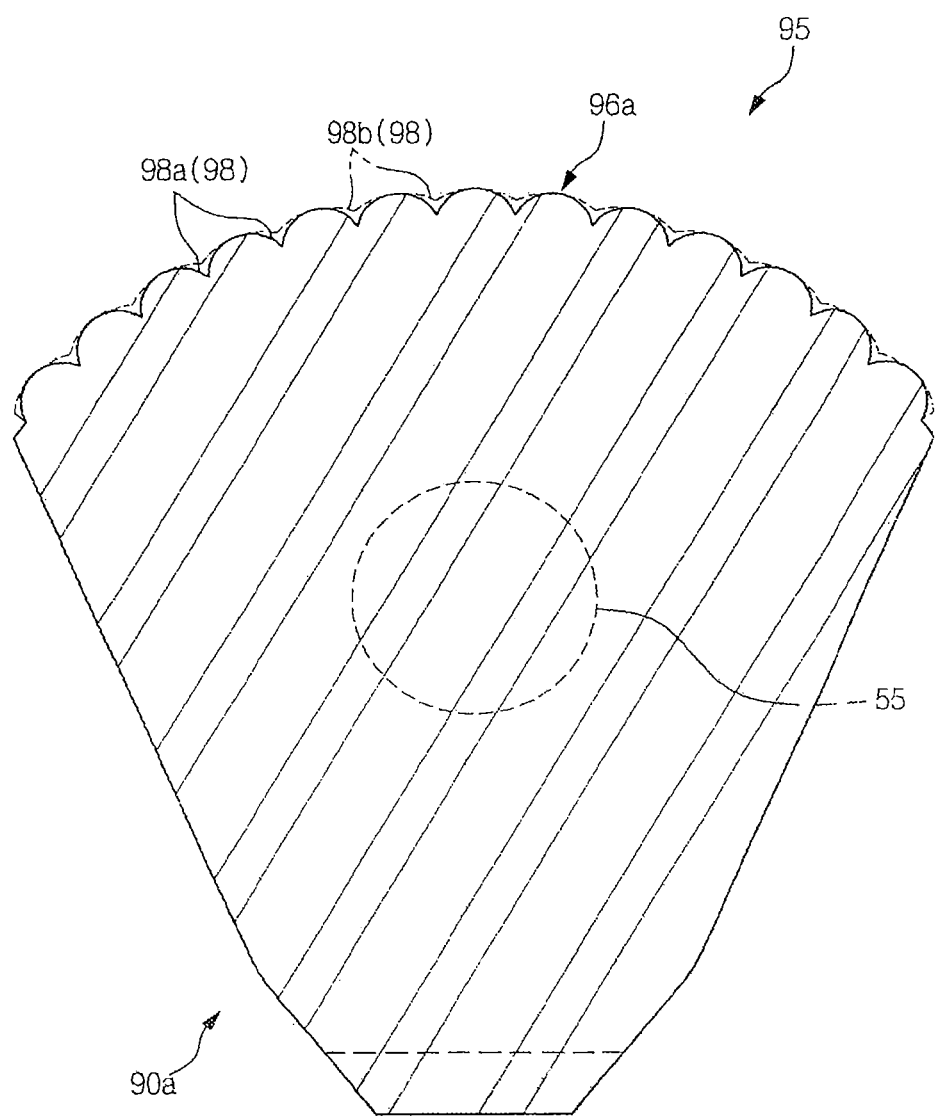
FIG. 6 is a sectional view illustrating a light guide according to another embodiment.

For example, FIG. 6 is a sectional view of a light guide 90a according to another embodiment. As shown in FIG. 6, a diffusion pattern 96a may have varied cross sections along the longitudinal direction of the light guide 90a. In FIG. 6, the solid line illustrates a first part 98a of a semi-cylindrical structure 98 adjacent to a light source 55, and the dotted line illustrates a second part 98b of the semi-cylindrical structure 98 in or near the center of the light guide 90a.

The second part 98b in or near the center of the light guide 90a may have a radius of curvature larger than that of the first part 98a of the light guide 90a adjacent to the light source 55, for example. In a region of the light guide 90a adjacent to the light source 55, the light emitted from the emission face 95 of the light guide 90a may be concentrated in the sub scanning direction Y. It may thus be desirable that a radius of curvature of the first part 98a of the semi-cylindrical structures 98 adjacent to the light source 55 be smaller than that of the second part 98b, in order to increase a diffusion angle of light. To prevent loss of light due to excessive diffusion of light in or near the center of the light guide 90a, it may be desirable that a radius of curvature of the second part 98b of the semi-cylindrical structure 98 be larger than the first part 98a adjacent to the light source 55.

The cross section of the diffusion pattern 96a may vary in the longitudinal direction of the light guide 90a, for example, to prevent unusual or undesirable change in the distribution of light quantity at a specific position of the emission face 95.

It should also be noted that although the above embodiments describe the diffusion pattern having semi-cylindrical structures by way of example, a diffusion pattern of prismatic or other structures is also possible.

Figure 7:
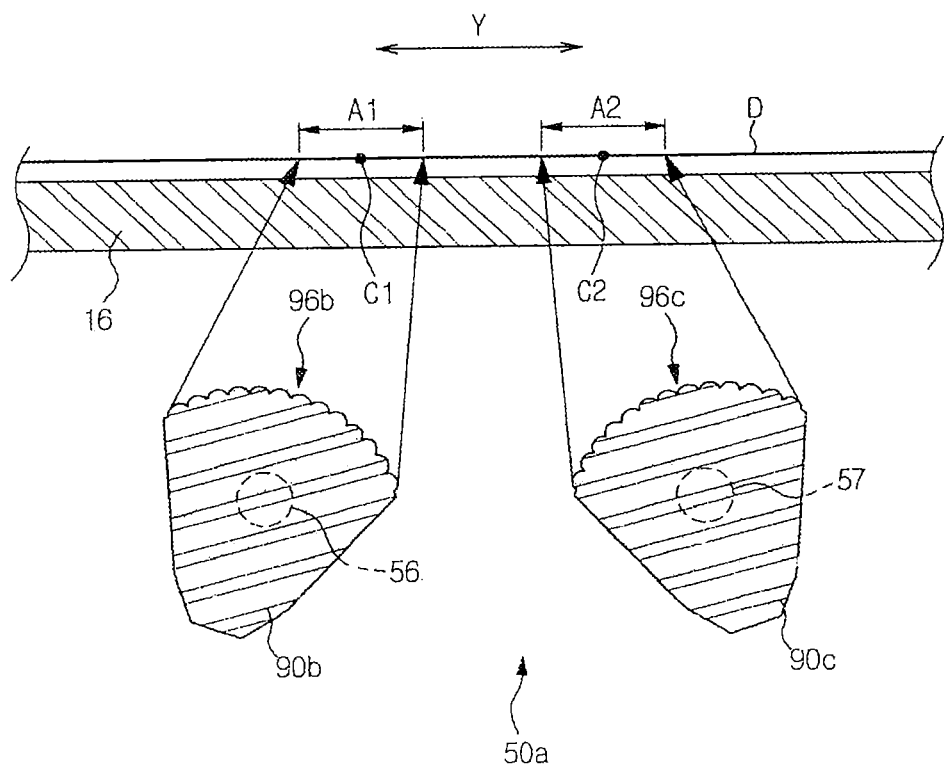
FIG. 7 is a view illustrating a configuration of an illuminator according to an embodiment.

FIG. 7 is a view illustrating a configuration of an illuminator 50a according to an embodiment. As shown in FIG. 7, the illuminator 50a may include a plurality of light sources 56 and 57 arranged in the sub scanning direction Y and a plurality of light guides 90b and 90c arranged respectively to correspond to the plurality of light sources 56 and 57.

The plurality of light guides 90b and 90c may be arranged and configured to irradiate light to different positions on the document in the sub scanning direction Y. For example, the first light guide 90b may be arranged to irradiate light to a first region A1 of the document while the second light guide 90c may be arranged to irradiate light to a second region A2 of the document. Although two light sources, 56 and 57, along with respective light guides, 90b and 90c, are described with respect to FIG. 7, additional light sources may also be incorporated in the illuminator.

Figure 8:
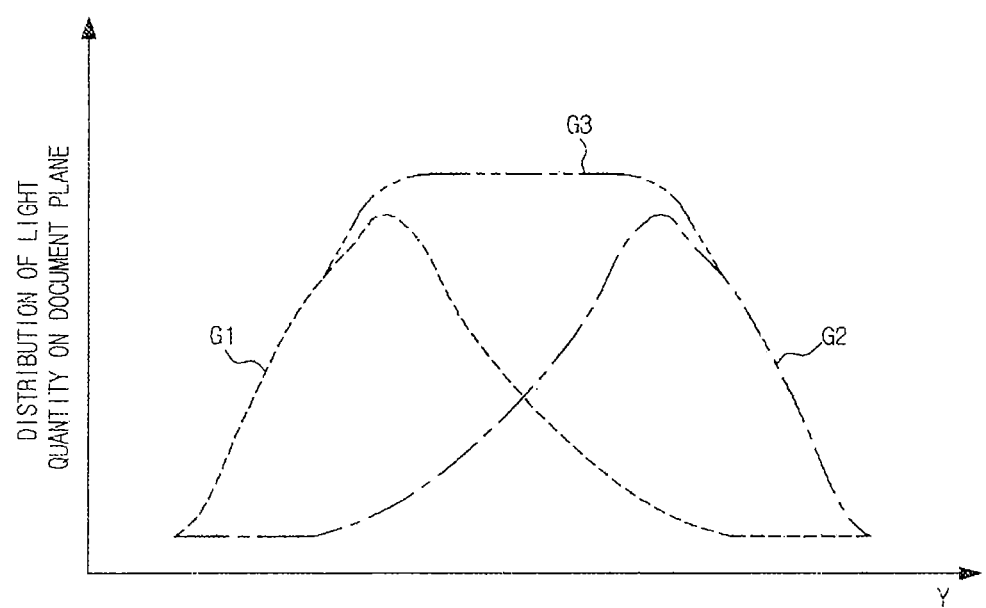
FIG. 8 is a graph illustrating distribution of light quantity on a document plane based on the arrangement of the light source and light guide as shown in FIG. 7.

FIG. 8 is a graph illustrating distribution of light quantity on a document plane based on the arrangement of the light sources 56 and 57 and light guides 90b and 90c according to the illuminator 50a of FIG. 7. With the above-described configuration of the illuminator 50a of FIG. 7, the graph of FIG. 8 illustrates that based on a sum of light quantity irradiated to the first region A1 and second region A2 of the document, uniform distribution of light quantity may be realized between a center position C1 of the first region A1 and a center position C2 of the second region A2. In FIG. 8, reference letter "G1" designates a distribution curve of light quantity irradiated to the document D from the first light guide 90b, reference letter "G2" designates a distribution curve of light quantity irradiated to the document D from the second light guide 90c, and reference letter "G3" designates a distribution curve of total light quantity irradiated to the document D.

The light guides 90b and 90c may be provided respectively at emission faces thereof with diffusion patterns 96b and 96c, for example, which extend from one longitudinal end to the other longitudinal end of the light guides 90b and 90c. The diffusion patterns 96b and 96c may realize uniform or near-uniform distribution of light quantity both in the sub scanning direction Y and the main scanning direction X. The description of FIGS. 3 to 6 may be applied to the diffusion patterns 96b and 96c.

With reference again to FIG. 1, the printing device 3 may include a paper supply unit 110, a light scanning unit 120, photosensitive bodies 130Y, 130M, 130C, and 130K, a developing unit 140, a transfer unit 160, a fusing unit 170 and a paper discharge unit 180.

The paper supply unit 110 may include a cassette 111 in which paper S, or other printing media, may be stored, a pickup roller 112 configured to pick up the paper S stored in the cassette 111 sheet by sheet, and delivery rollers 113 configured to deliver and provide the picked-up paper toward the transfer unit 160.

The light scanning unit 120 may be configured to irradiate light, corresponding to image information, to the photosensitive bodies 130Y, 130M, 130C, and 130K, thereby forming electrostatic latent images on surfaces of the photosensitive bodies 130Y, 130M, 130C, and 130K.

The developing unit 140 may be configured to feed developer to the electrostatic latent images formed on the photosensitive bodies 130Y, 130M, 130C, and 130K, thereby forming visible images. The developing unit 140 may include four developing devices 140Y, 140M, 140C, and 140K in which different colors of developers, for example, yellow developer, magenta developer, cyan developer, and black developer, are received respectively. The developing unit 140 is not limited to four developing devices, and more or fewer developing devices may be incorporated within the developing unit 140. Hereinafter, although only the developing device 140Y in which the yellow developer is received will be described, it will be appreciated that the following description may applied to the remaining three developing devices 140M, 140C, and 140K.

Figure 9:
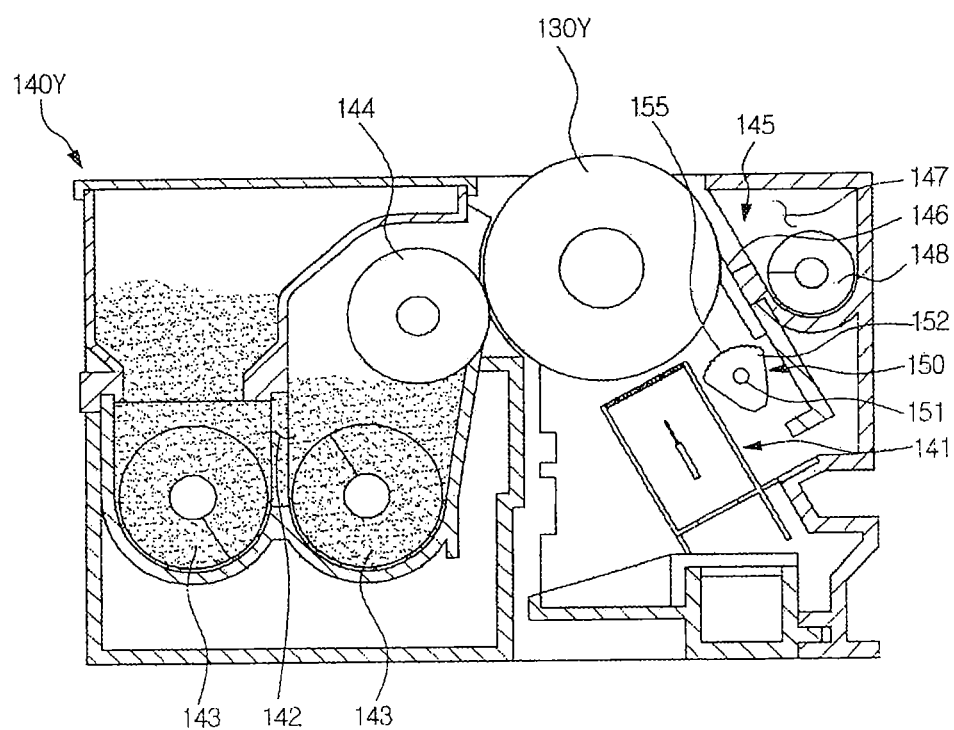
FIG. 9 is an enlarged view illustrating a developing device of FIG. 1.

FIG. 9 illustrates in greater detail the developing device 140Y of FIG. 1. As shown in FIG. 9, the developing device 140Y may includes a charger 141, a developer storage 142, one or more developer delivery members 143, a developing member 144, a waste developer collector 145 and a charge eliminator 150.

The charger 141 may be configured to charge the surface of the photosensitive body 130Y prior to the electrostatic latent image being formed on the photosensitive body 130Y. The developer stored in the developer storage 142 may be delivered to the developing member 144 by at least one of the one or more developer delivery members 143. The developing member 144 may be configured to feed the developer to the electrostatic latent image formed on the photosensitive body 130Y, thereby enabling formation of a visible image.

The visible image formed on the photosensitive body 130Y may be transferred to a transfer belt 161 (shown in FIG. 1). A portion of the developer may remain on the photosensitive body 130Y.

The waste developer collector 145 may be configured to collect waste developer remaining on the photosensitive body 130Y. The waste developer collector 145 may include a cleaning member 146, a waste developer storage 147 and a waste developer delivery member 148. The cleaning member 146 removes the waste developer from the photosensitive body 130Y, and the removed waste developer is received in the waste developer storage 147, from where it may be delivered into a separate waste developer container (not shown) by the waste developer delivery member 148.

The charge eliminator 150 may be configured to eliminate or reduce electric potential remaining on the surface of the photosensitive body 130Y prior to charging the photosensitive body 130Y. The charge eliminator 150 may be, for example, a type of illuminator that irradiates light to the photosensitive body 130Y, and may include a light source 151 and a light guide 152.

The light source 151 may be arranged adjacent to a longitudinal end of the light guide 152 (extending perpendicular to the plane of the drawing). The light guide 152 may comprise an incidence face that faces the light source 151. The light guide may further include an emission face that irradiates light passing through the interior of the light guide 152 to the photosensitive body 130Y.

A diffusion pattern 155 may be provided on the emission face of the light guide 152 to enable uniform or near-uniform irradiation of light to the photosensitive body 130Y. The diffusion pattern 155 may extend from one longitudinal end to the other longitudinal end of the light guide 152. The diffusion pattern 155 may include a plurality of semi-cylindrical structures arranged in a width direction of the light guide 152.

The description of FIGS. 3 to 6 may also be applicable to the light guide 152.

With reference again to FIG. 1, the transfer unit 160 may include the transfer belt 161, a drive roller 162, a supporting roller 163, one or more tension rollers 164, and first transfer rollers 165. The transfer belt 161 may rotate while being supported by one or more of the drive roller 162, the supporting roller 163, and the tension rollers 164.

The visible images formed on the respective photosensitive bodies 130Y, 130M, 130C and 130K may be transferred to the transfer belt 161, by the first transfer rollers 165, to overlap each other. The resulting image on the transfer belt 161 may be transferred to paper delivered from the paper supply unit 110 while the paper passes between a second transfer roller 166 and the transfer belt 161.

The paper, after having passed through the transfer unit 160, may enter the fusing unit 170. The fusing unit 170 may include a heating roller 171 and a press roller 172. As the paper, on which the image is transferred, passes between the heating roller 171 and the press roller 172, the image may be fixed to the paper by heat and pressure.

The paper, after having passed through the fusing unit 170, may be guided to the paper discharge unit 180 to be discharged by one or more paper discharge rollers 181.

The above-described embodiments provide an image reading device enabling uniform or near-uniform irradiation of light to a document, thus resulting in enhanced image reading performance. Further, when applying the uniform or near-uniform irradiation of light to an image forming apparatus, enhanced performance of a charge eliminator may be achieved.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:

1. An image forming apparatus, comprising:
   an illuminator configured to irradiate light to a photosensitive body so as to change a level of electrical potential of the photosensitive body;
   wherein the illuminator comprises at least one light source configured to generate light and a light guide configured to guide the light received from the light source toward the photosensitive body; and
   wherein the light guide comprises at least one incidence face and an emission face, the at least one incidence face facing the light source in a main scanning direction of the image forming apparatus to receive the light from the at least one light source into the light guide, the light exiting from the light guide through the emission face toward the photosensitive body, the emission face comprising a diffusion pattern formed thereon, the diffusion pattern having a plurality of semi-cylindrical structures arranged along a width direction of the light guide, and
   wherein a radius of curvature of the plurality of semi-cylindrical structures becomes increased while getting farther away from the at least one light source.

2. The apparatus according to claim 1, wherein the emission face is symmetrical about a center along the main scanning direction.

3. The apparatus according to claim 1, wherein the at least one light source comprises a first light source facing a first longitudinal end surface of the light guide and a second light source facing a second longitudinal end surface of the light guide opposite the first longitudinal end surface.

4. The apparatus according to claim 1, wherein the at least one light source comprises a light emitting diode (LED).

5. The apparatus according to claim 1, wherein the light guide further comprise a reflecting face and one or more guide faces, wherein the reflecting face and the one or more guide faces are configured to guide the light received through the at least one incidence face toward the emission face.

6. The apparatus according to claim 4, wherein the reflecting face comprises a plurality of reflecting patterns in the form of prisms.

* * * * *